SAMUEL STRELZOFF
ABE WARSHAW
JOHN F. VILLIERS-FISHER
SYDNEY ATKIN
INVENTORS

United States Patent Office 3,518,073
Patented June 30, 1970

3,518,073
SOLVENT EXTRACTION PROCESS FOR THE PRODUCTION OF AMMONIUM NITRATE FERTILIZER PRODUCT AND PHOSPHORIC ACID MIXED WITH NITRIC ACID
Samuel Strelzoff, New York, and Abe Warshaw, Clark, N.Y., and John F. Villiers-Fisher, Kendall Park, and Sydney Atkin, Springfield, N.J., assignors to Chemical Construction Corporation, New York, N.Y., a corporation of Delaware
Filed Jan. 23, 1967, Ser. No. 610,911
Int. Cl. C05c 1/00; C05d 7/00
U.S. Cl. 71—60                   2 Claims

ABSTRACT OF THE DISCLOSURE

Phosphate rock is digested with aqueous nitric acid, to produce an aqueous solution containing calcium nitrate and phosphoric acid. In most instances, an excess of nitric acid is employed, so that the aqueous solution also contains nitric acid, which passes through the process together with the phosphoric acid. The aqueous solution is extracted with a suitable first organic solvent such as amyl alcohol, to yield an aqueous phase rich in calcium nitrate and an organic solvent phase rich in phosphoric acid and nitric acid. The organic solvent phase is extracted with water, to yield aqueous phosphoric acid solution and regenerated organic solvent. In most instances, a significant proportion of organic solvent remains in the calcium nitrate-rich aqueous solution and in the aqueous phosphoric acid solution. In this case, these solutions are extracted with a second organic solvent which is water-immiscible, such as benzene, and the resulting mixed solvents stream is separated into recycle components with or without resort to distillation. The aqueous calcium nitrate solution is then reacted with ammonia and carbon dioxide at a pH above 5, to form ammonium nitrate and precipitate calcium carbonate, which is filtered off. The filtrate provides product ammonium nitrate solution. The co-product aqueous phosphoric acid solution may be a final product per se; however this solution will usually be reacted with ammonia to yield ammonium phosphate-nitrate fertilizer. The process provides a sequence for depressing calcium nitrate concentration in the acid rich first organic solvent stream, by extraction with a small stream of aqueous phosphoric acid solution containing nitric acid. In one embodiment of the invention, the water-immiscible solvent containing dissolved first solvent is regenerated by extraction of first solvent, employing the aqueous digester effluent and water in series, or by distillation, and the resultant water containing dissolved first solvent is then employed for the production of phosphoric acid solution by extraction of the acid rich organic solvent phase.

BACKGROUND OF THE INVENTION

Field of the invention

Figure 1:
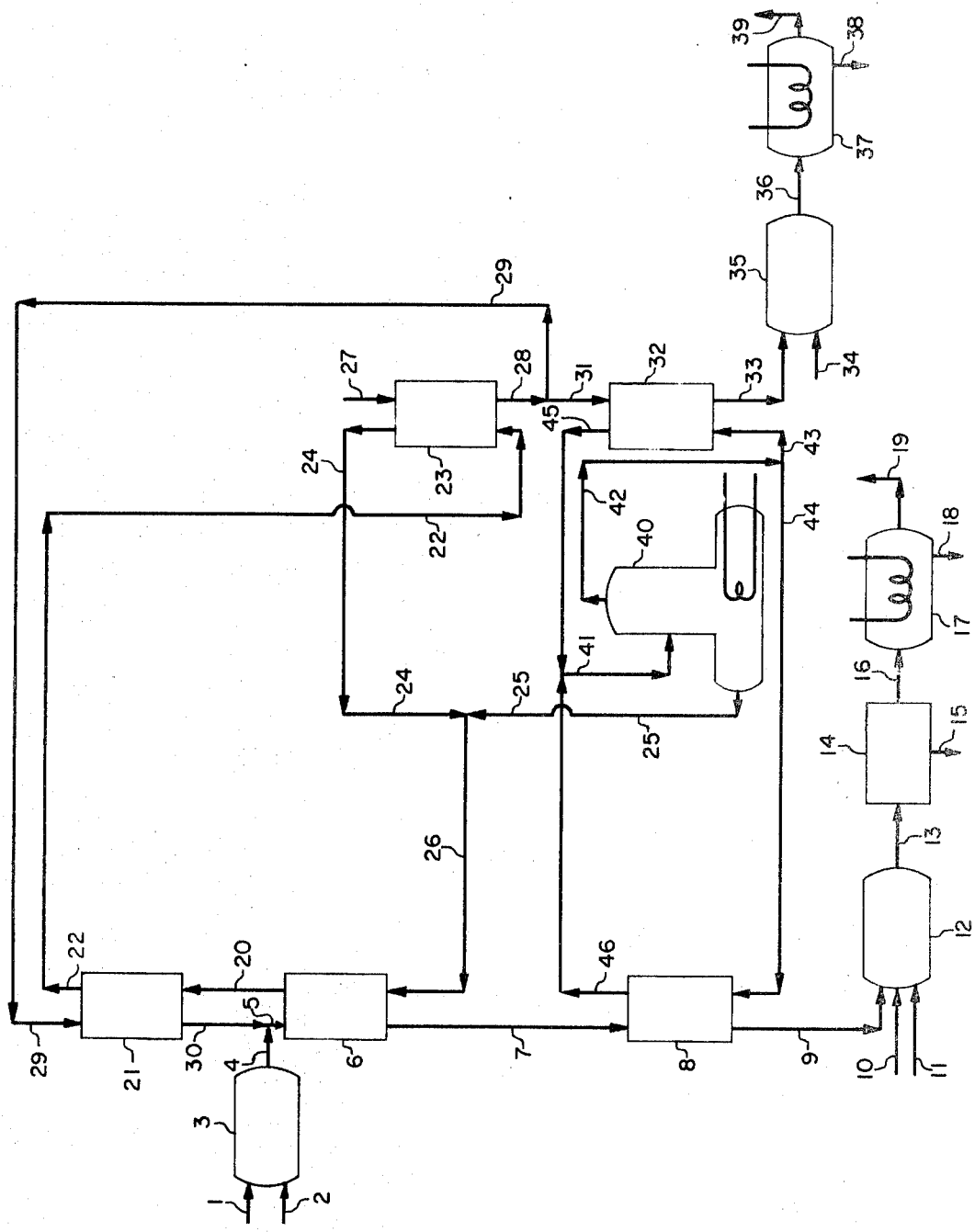

The invention relates to the digestion of phosphate rock with nitric acid, to form useful products such as phosphoric acid, and fertilizer materials such as ammonium nitrate and a mixture of ammonium nitrate and ammonium phosphate. A solvent extraction process is provided for separating calcium nitrate from phosphoric acid in the digester effluent solution, which enables the production of phosphoric acid free of calcium content, and the phosphoric acid may then be ammoniated to produce ammonium phosphate fertilizer.

Description of the prior art

Numerous patents and other disclosures pertain to the solvent extraction of phosphoric acid values from the digester effluent produced by the digestion of phosphate rock with sulfuric acid, which is the conventional acid employed in commercial facilities. In such installations, the digester effluent contains relatively insoluble calcium sulfate, which simplifies the separate recovery of liquid phosphoric acid by solvent extraction employing various solvents, such as those suggested in U.S. Pats. Nos. 1,462,840; 1,499,611; 1,838,431; 1,857,470; 1,929,441; 1,929,442; 1,929,443; 1,968,544; 2,493,915; 2,880,063; 2,885,265; 2,885,266; 2,899,292; 2,914,380; 2,955,918; 3,072,461; 3,118,730; British Pats. Nos. 805,517; 953,156; 953,378 and Canadian Pats. Nos. 575,861 and 685,010. In addition, U.S. Pat. No. 3,245,777 provides a nitric acid digestion procedure in which a mixture of monobasic calcium phosphate and calcium nitrate is extracted with a lower alcohol or ketone to selectively remove calcium nitrate. Other similar patents include U.S. 2,849,280; 2,882,123 and 2,859,092 and British Pat. No. 1,049,197.

SUMMARY OF THE INVENTION

In the present invention, phosphate rock is digested with nitric acid, and the resulting aqueous solution containing dissolved calcium nitrate and phosphoric acid values is extracted with a selective first organic solvent such as amyl alcohol, to remove phosphoric acid into the organic phase while leaving calcium nitrate in the aqueous phase. The organic phase is then separately extracted with water, so that aqueous phosphoric acid is produced as a product. The aqueous phosphoric acid may be subsequently ammoniated to produce ammonium phosphate fertilizer. When sufficient nitric acid is employed in digestion of the phosphate rock to permit selective extraction of the phosphate values, nitric acid will be recovered along with the phosphoric acid, and in this case the ammonium phosphate fertilizer will also contain ammonium nitrate.

The aqueous calcium nitrate solution is reacted with ammonia and carbon dioxide at a pH above 5, to produce ammonium nitrate and precipitate calcium carbonate, which is filtered from product ammonium nitrate solution. The product solutions may be concentrated as desired, to produce solid products or anhydrous melt.

Besides the novel features mentioned supra, the invention also provides a sequence for removing dissolved calcium nitrate from the acid rich organic solvent, by extraction with a side stream of aqueous phosphoric-nitric acids solution, which subsequently joins the digester effluent.

In most instances, a minor portion of the first organic solvent will remain in the aqueous calcium nitrate and phosphoric acid solutions. Depending on the proportion and cost of the solvent and product purity specifications, this loss may be tolerated in some instances. However, in most cases the dissolved organic solvent must be recovered from the aqueous solutions. This is accomplished by extracting the aqueous solutions with a water-immiscible second organic solvent such as benzene. A novel sequence for regenerating the water-immiscible solvent is provided, in which the water-immiscible solvent laden with recovered primary organic solvent is extracted in series with the aqueous digester effluent and the feed water stream which is subsequently passed to the aqueous phosphoric acid production step.

The primary advantage of the invention is that a solvent extraction sequence is provided for the production of ammonium nitrate and phosphoric acid, from the effluent stream produced by digestion of phosphate rock with nitric acid. Another advantage is that useful fertilizer products, namely ammonium nitrate and a mixture of ammonium nitrate-phosphate, may also be produced. A further advantage is that calcium nitrate is completely separated from phosphoric acid in the digester effluent.

Another advantage is that the water-immiscible solvent used to recover primary solvent from the aqueous solutions is regenerated by extraction with aqueous process streams, which eliminates a distillation sequence.

It is an object of the present invention to provide an improved solvent extraction process for the production of ammonium nitrate and a mixture of phosphoric acid and nitric acid rich in phosphates from the effluent solution produced by digestion of phosphate rock with nitric acid.

Another object is to produce useful fertilizer products by the digestion of phosphate rock with nitric acid.

A further object is to provide a solvent extraction process for the treatment of the digester effluent solution produced by digestion of phosphate rock with nitric acid, so as to separate calcium nitrate from phosphoric acid.

These and other objects and advantages of the present invention will become evident from the description which follows.

DESCRIPTION OF THE DRAWINGS AND PREFERRED EMBODIMENTS

Figure 2:
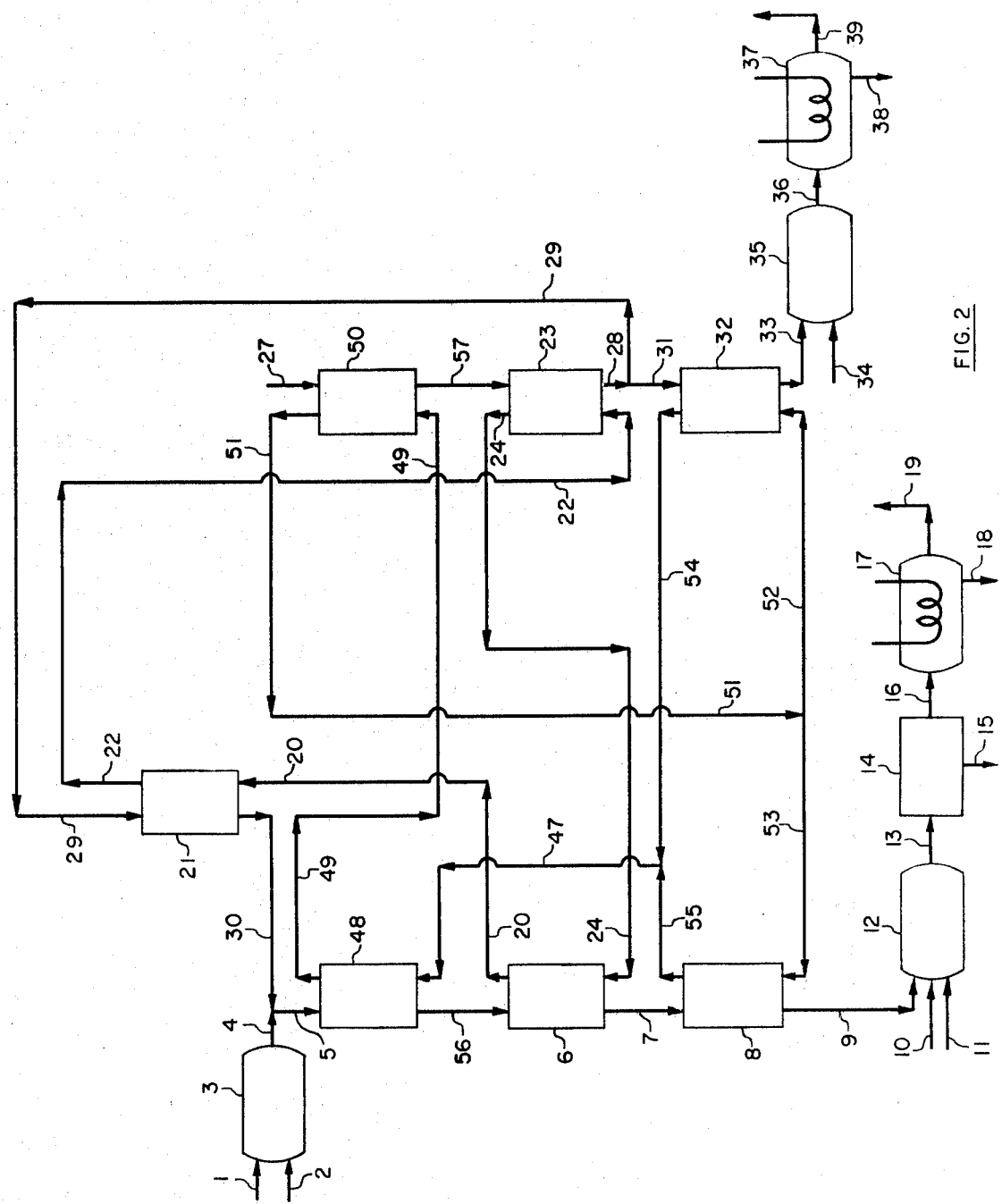

Referring to the figures, FIG. 1 is a flowsheet of one embodiment of the invention, and FIG. 2 provides a flowsheet of a preferred alternative embodiment of the invention. The flowsheets will be described with respect to the use of isoamyl alcohol as a preferred primary or first organic solvent for the extraction of phosphoric acid; however other organic solvents such as n-amyl alcohol, isobutyl alcohol, cyclohexanol, normal butyl alcohol, methyl cyclohexanol and 2-pentanone, aso provide effective extraction. In addition, methyl isobutyl ketone, normal butyl phosphate, butyl acetamide, isopropyl ether, tertiary amyl alcohol, 3-pentanone, 2-heptanone, 3-heptanone and methyl ethyl ketone provide satisfactory results as primary phosphoric acid solvents. The preferable water-immiscible secondary solvent employed in the present invention to recover amyl alcohol from aqueous solutions is benzene; however effective results are also attained with petroleum ether or other water-immiscible organic solvents which selectively extract the primary solvent such as amyl alcohol from aqueous solution.

Referring now to FIG. 1, the phosphate rock stream 1 and aqueous nitric acid stream 2 are reacted in digester 3, to produce an aqueous solution containing calcium nitrate, phosphoric acid, residual nitric acid, and a small amount of residual solid sludge. The solid sludge may be removed by means not shown, such as by the addition of a flocculating agent followed by thickening and/or filtration.

In any case, a clear aqueous solution stream 4 is produced, which contains calcium nitrate, phosphoric acid and nitric acid. Stream 4 is combined with recycle aqueous solution stream 30 containing phosphoric acid, nitric acid, with small amounts of calcium nitrate and isoamyl alcohol, derived in a manner to be described infra. The resulting combined aqueous stream 5 now passes to extractor 6, which is a countercurrent liquid-liquid contact extractor. It will be understood that in the process description and claims infra, reference to an extractor or an extraction step refers to countercurrent liquid-liquid contact extraction.

The aqueous stream 5 is contacted with isoamyl alcohol in unit 6. As mentioned supra, other suitable first organic solvents may be employed instead of amyl alcohol, or a mixture of solvents may be employed. The resulting aqueous solution stream 7 contains essentially only calcium nitrate, together with a minor proportion of dissolved amyl alcohol. Stream 7 passes to extractor 8 for contact with benzene or other water-immiscible organic solvent, which removes the amyl alcohol into an organic liquid phase. The resulting aqueous calcium nitrate solution stream 9 is reacted with ammonia stream 10 and carbon dioxide stream 11 in reactor 12 at a pH above 5.0, to produce ammonium nitrate in solution and precipitate calcium carbonate. The resulting slurry stream 13 is filtered in filter 14, and by-product solid calcium carbonate stream 15 is passed to waste disposal. The clear ammonium nitrate solution stream 16 is now directly usable as a product of the process; however stream 16 will usually be concentrated in evaporator 17 to produce ammonium nitrate melt or crystals stream 18, with discharge of water vapor via 19.

Returning to the initial extractor 6, the discharged amyl alcohol solution stream 20 contains dissolved phosphoric acid and nitric acid values, together with a minor amount of calcium nitrate. Stream 20 passes initially through extractor 21, for removal of calcium nitrate by contact with a small aqueous stream of recycle liquor, from extractor 23 through conduit 29, having high initial phosphoric acid and nitric acid content. The resulting amyl alcohol solution stream 22, now having negligible calcium nitrate content but rich in phosphoric acid and nitric acid values, is passed through extractor 23 for contact with fresh water, which removes most of the phosphoric and nitric acids. The resulting amyl alcohol stream 24 is recycled to extractor 6, together with recovered amyl alcohol stream 25, via stream 26.

Returning to extractor 23, fresh water stream 27 passes in contact with the amyl alcohol solution and absorbs phosphoric and nitric acid, together with a small proportion of amyl alcohol. The resulting aqueous stream 28 is divided, with a minor proportion passing via stream 29 to extractor 21 in order to recover calcium nitrate from amyl alcohol solution, with the resulting aqueous stream 30 being combined with stream 4 to form stream 5. The balance of stream 28 passes via stream 31 to extractor 32, which is similar in function to extractor 8, in that amyl alcohol is removed from the aqueous phase by contact with benzene. The resulting aqueous phase stream 33, having negligible amyl alcohol content, is a phosphoric-nitric acid solution of commercial value, and may be directly utilized as a product of the process for various phosphoric acid usages. However, in some instances stream 33 may be further processed to produce a fertilizer product. In this case, stream 33 is reacted with ammonia stream 34 in reactor 35, to form a mixture of ammonium phosphate and ammonium nitrate in solution. The resulting stream 36 is passed to evaporator 37, for the production of a granular mixture or melt stream 38 consisting of ammonium phosphate-nitrate, with discharge of water vapor via stream 39.

A typical benzene processing sequence is also shown in FIG. 1. Central still 40 separates mixed benzene-amyl alcohol stream 41 into separate benzene and amyl alcohol components by distillation. The separated amyl alcohol component passes from still 40 via stream 25 to the amyl alchol circuit as recovered amyl alcohol. The benzene component passes from still 40 via stream 42, which is divided into streams 43 and 44. The individual benzene streams 43 and 44 serve for extraction of amyl alcohol from aqueous solutions, and pass to extractors 32 and 8 respectively. Benzene streams 45 and 46 containing dissolved amyl alcohol are recovered from extractors 32 and 8 respectively. Streams 45 and 46 are combined to form stream 41.

FIG. 2 illustrates a preferred embodiment of the invention, and is similar to FIG. 1, except that an improved benzene regeneration circuit is provided and the benzene-amyl alcohol separation still is eliminated. Amyl alcohol is separated from benzene by passing the mixed benzene-amyl alcohol stream in contact with aqueous process streams which are initially free of amyl alcohol, and thus the amyl alcohol passes from the benzene solution to the aqueous solutions and returns to the amyl alcohol circuit. Only the benzene circuit will be described in FIG. 2, since the balance of the process is identical with FIG. 1. The mixed benzene-amyl alcohol stream 47 passes to extractor 48, for partial removal of amyl alcohol which is absorbed into the aqueous phase. The resulting benzene stream 49 of depleted amyl alcohol content passes to extractor 50 for further removal of amyl alcohol which is absorbed into the aqueous phase. The regenerated benzene stream 51, now containing only a very minor residual proportion of amyl alcohol, is suitable for reuse in extracting residual amyl alcohol from aqueous process streams. Stream 51 is divided into streams 52 and 53, which pass to extractors 32 and 8 respectively. The resulting benzene-amyl alcohol streams 54 and 55 derived from units 32 and 8 respectively are combined to form stream 47. Aqueous stream 56, now containing amyl alcohol as well as calcium nitrate, phosphoric acid and nitric acid, passes from extractor 48 to extractor 6 for processing as described supra. Aqueous stream 57, now containing amyl alcohol as well as phosphoric acid and nitric acid, passes from extractor 50 to extractor 23 for processing as described supra.

Numerous alternatives within the scope of the present invention will occur to those skilled in the art. Operating ranges or suitable magnitudes of process variables such as temperature and solution concentrations employed in practice of the invention will depend on specific solvents to be employed and may be readily selected by those skilled in the art to produce optimum results. In general, the extraction steps will be carried out at substantially ambient temperatures or at temperatures in the range of about 0° C. to about 60° C., and aqueous nitric acid concentrations from about 10% to about 40% and preferably about 30% by weight will be employed. A slight excess of nitric acid is preferable during digestion, on the order of about 7% over the stoichiometric requirement. In some fertilizer regions, there is a need for nitrochalk fertilizer. Thus, in some cases, the filtration procedure of unit 14 may be omitted, and stream 18 will consist of solid nitrochalk fertilizer. Stream 38 has been indicated as containing ammonium phosphate and ammonium nitrate. It will be apparent to those skilled in the art that stream 38 may contain either monoammonium phosphate, diammonium phosphate, triammonium phosphate, or a mixture of these individual phosphates, depending on the proportion of ammonia added via stream 34.

Some of the primary organic solvents which may be employed for the removal of phosphoric acid and nitric acid from stream 5 in unit 6 may be relatively insoluble in water. In this instance, auxiliary water-immiscible solvent circuit may not be required, and units 8, 32, and 40 of FIG. 1 or units 8, 32, 48, and 50 of FIG. 2 may be omitted, together with their associated benzene streams. Similarly, some of the primary organic solvents which may be employed for the removal of phosphoric acid and nitric acid from stream 5 in unit 6 may have a negligible capacity for dissolving calcium ions, in which case stream 20 will have a negligible content of calcium nitrate, and unit 21 and streams 22 and 29 may be omitted, with stream 20 passing directly to unit 23. Finally, stream 19 or 39 or both may be condensed and recycled via stream 27, in order to recover the small amounts of amyl alcohol and benzene present in these streams.

An example of industrial application of the process of the present invention will now be described.

EXAMPLE

Ground phosphate rock is digested with 60% nitric acid in a digester. A mole ratio of nitric acid to calcium oxide of 2.15:1 is maintained in the digester, and the digester effluent stream diluted with recycle water from the slimes separation system is initially processed by thickening with a flocculating agent. The clear overflow is passed to solvent extraction as stream 4. Following are the compositions of principal process streams, expressed on an analysis basis in terms of equivalent mass as analyzed. For example, phosphoric acid content is expressed in terms of equivalent phosphorus pentoxide mass which would be present if all of the phosphorus in the acid was converted to phosphorus pentoxide. Other components are expressed in terms of actual mass, as indicated.

TABLE I.—COMPOSITION OF STREAM, KG.

| Stream No. | Total | $P_2O_5$ | Ca | Total nitrate | Water | Amyl alcohol | Benzene | $NH_4NO_3$ | Mono ammonium phosphate |
|---|---|---|---|---|---|---|---|---|---|
| 4 | 1,483 | 139 | 136.5 | 466.2 | 738.3 | | | | |
| 5 | | 153.9 | 137.7 | 481.2 | 838.3 | 5 | | | |
| 7 | | 3 | 137.2 | 366.2 | 838.3 | 50 | | | |
| 20 | | 147.3 | 2.3 | 370 | 78 | 3300 | | | |
| 30 | | 14.9 | 1.6 | 15.5 | 100 | 5 | | | |
| 22 | | 146 | 0.7 | 365 | 198 | 3300 | | | |
| 27 [1] | | | | | 1,100 | 2.45 | 3.9 | | |
| 24 | | 10.3 | 0.2 | 31.5 | 75 | 1,250 | | | |
| 25 | | | | | 95 | | | | |
| 29 | | 13.6 | 0.05 | 15 | 100 | 5 | | | |
| 31 | | 136 | 0.5 | 150 | 1000 | 50 | | | |
| 43 | | | | | | | 150 | | |
| 44 | | | | | | | 150 | | |
| 45 | | | | | | 47.5 | 146 | | |
| 46 | | | | | | 47.5 | 146 | | |
| 9 | | 3 | 137.2 | 366.2 | 838.3 | 2.5 | 4 | | |
| 13 [2] | | | | | 780 | 2.5 | 4 | 472 | |
| 15 [2] | | | | | | 0.05 | 0.08 | 10 | |
| 19 | | | | | 780 | 2.45 | 3.9 | | |
| 18 | | | | | | | | 462 | |
| 33 | | 136 | 0.5 | 100 | 1,000 | 2.5 | 4 | | |
| 36 [3] | | | | | 925 | 2.5 | 4 | 161 | 210 |
| 38 | | | | | | | | 161 | 210 |

[1] Includes recycle of stream 19.
[2] Streams 13 and 15 also contained 342 kg. calcium carbonate and 3.5 kg. calcium hydrogen phosphate. In addition, stream 15 contained 150 kg. wash water.
[3] Stream 36 also contained 1.5 kg. calcium hydrogen phosphate.

Data was also developed relative to an alternative preferred embodiment of the invention as described supra with respect to FIG. 2, in which the benzene containing dissolved amyl alcohol is regenerated by series extraction of amyl alcohol employing the aqueous digester effluent liquor and the feed water streams to dissolve amyl alcohol from benzene. Following are the compositions of pertinent process streams.

TABLE II.—COMPOSITION OF STREAM, KG.

| Stream No. | Total | Water | Benzene | Amyl alcohol |
|---|---|---|---|---|
| 5 | 1,480 | | | |
| 56 | 1,520 | | | 40 |
| 27 | | 1,100 | | |
| 57 | | 1,000 | | 40 |
| 47 | | | 292 | 95 |
| 49 | | | 292 | 55 |
| 51 | | | 292 | 15 |

What is claimed is:
1. A process for the production of an ammonium nitrate-containing fertilizer product and phosphoric acid which comprises

(a) digesting phosphate rock with aqueous nitric acid, to produce a first aqueous stream containing calcium nitrate, phosphoric acid, and excess unreacted nitric acid, (b) adding a second aqueous stream recycled according to step (e) and containing calcium nitrate, phosphoric acid and nitrate acid to said first aqueous stream to form a combined aqueous stream, (c) countercurrently extracting said combined aqueous stream of step (b) with an acid-depleted first organic solvent derived from step (f), said first organic solvent being selected from the group consisting of isoamyl alcohol, n-amyl alcohol, isobutyl alcohol, cyclohexanol, normal butyl alcohol, methyl cyclohexanol, 2-pentanone, methyl isobutyl ketone, normal butyl phosphate, butyl acetamide, isopropyl ether, tertiary amyl alcohol, 3-pentanone, 2-heptanone, 3-heptanone and methyl ethyl ketone, whereby a major portion of said calcium nitrate and a minor proportion of said first organic solvent remains in said combined aqueous stream and the balance of said calcium nitrate, said phosphoric acid and said nitrate acid are dissolved in said first organic solvent to form acid-rich first organic solvent, (d) countercurrently extracting the acid-rich first organic solvent derived from step (c) with a third aqueous stream recycled from step (g) and containing phosphoric acid, nitric acid, and a minor proportion of first organic solvent, whereby calcium nitrate is dissolved from the acid-rich first organic solvent into said aqueous stream, (e) recycling the resulting aqueous stream formed by step (d) and containing dissolved calcium nitrate, phosphoric acid and nitric acid to step (b) as said second aqueous stream, (f) countercurrently extracting the acid-rich first organic solvent derived from step (d) with water, to form a fourth aqueous stream containing nitric acid, phosphoric acid, and a minor proportion of first organic solvent; and acid-depleted first organic solvent, (g) dividing said fourth aqueous stream into said third aqueous stream and a fifth aqueous stream, (h) separately countercurrently extracting said fifth aqueous stream from step (g) and said combined aqueous stream from step (c) with a second organic solvent selected from the group consisting of benzene and petroleum ether, said second organic solvent being water-immiscible, whereby first organic solvent is removed from said aqueous streams and dissolved into said second organic solvent, and said fifth aqueous stream and said combined aqueous stream are each rendered free of first organic solvent, and said fifth aqueous stream is thereby converted to product aqueous nitric-phosphoric acid solution, (i) processing the second organic solvent containing first organic solvent and produced by step (h), by resort to distillation, to produce recycle streams of second organic solvent and first organic solvent, and (j) processing the combined aqueous solution produced by step (h) and free of first organic solvent and containing dissolved calcium nitrate, to form an ammonium nitrate-containing fertilizer product, by reacting said aqueous calcium nitrate solution with ammonia and carbon dioxide at a pH above 5, to form ammonium nitrate in aqueous solution and precipitate solid calcium carbonate, and evaporating water from the resulting solution to form a solid nitrate product containing nitrate as ammonium nitrate.

2. A process for the production of an ammonium nitrate-containing fertilizer product and an aqueous nitric-phosphoric acid solution which comprises (a) digesting phosphate rock with aqueous nitric acid, to form a first aqueous stream containing dissolved calcium nitrate, phosphoric acid and residual nitric acid, (b) countercurrently extracting a mixed organic solvents stream containing first organic solvent and second organic solvent, and recycled from step (g), with said first aqueous stream, said first organic solvent being selected from the group consisting of isoamyl alcohol, n-amyl alcohol, isobutyl alcohol, cyclohexanol, normal butyl alcohol, methyl cyclohexanol, 2-pentanone, methyl isobutyl ketone, normal butyl phosphate, butyl acetamide, isopropyl ether, tertiary amyl alcohol, 3-pentanone, 2-heptanone, 3-heptanone and methyl ethyl ketone, said second organic solvent being selected from the group consisting of benzene and petroleum ether, said second organic solvent being water-immiscible, whereby at least a portion of said first organic solvent is dissolved in the aqueous phase to form a second aqueous stream containing dissolved first organic solvent, calcium nitrate, phosphoric acid and nitric acid, and said second organic solvent is at least partially regenerated without resort to distillation, (c) countercurrently extracting said second aqueous stream derived from step (b) with regenerated first organic solvent recycled from step (d), whereby a third aqueous stream containing calcium nitrate and a small proportion of first organic solvent is formed, together with a first organic solvent phase containing phosphoric acid and nitric acid, (d) countercurrently extracting said first organic solvent phase produced by step (c) with water, whereby a fourth aqueous stream containing phosphoric acid, nitric acid and a small proportion of first organic solvent is formed, together with a regenerated first organic solvent phase, (e) countercurrently extracting said third aqueous stream formed by step (c) with second organic solvent, to remove first organic solvent from said third aqueous stream and form a mixed organic solvents phase and a fifth aqueous stream containing calcium nitrate, (f) countercurrently extracting said fourth aqueous stream formed by step (d) with second organic solvent, to remove first organic solvent from said fourth aqueous stream and form a mixed organic solvents phase and a product sixth aqueous stream containing phosphoric acid and nitric acid, (g) combining said mixed organic solvents phase from step (e) with said mixed organic solvents phase from step (f), to form a mixed organic solvents stream containing first organic solvent and second organic solvent, and recycling said mixed organic solvents to step (b), and (h) processing said fifth aqueous stream formed by step (e) and containing calcium nitrate to form an ammonium nitrate-containing product, by reacting said fifth aqueous stream with ammonia and carbon dioxide at a pH above 5, to form ammonium nitrate in aqueous solution and precipitate solid calcium carbonate, and evaporating water from the resulting solution to form a solid nitrate fertilizer product containing nitrate as ammonium nitrate.

References Cited
UNITED STATES PATENTS

| | | |
|---|---|---|
| 2,885,265 | 5/1959 | Cunningham. |
| 2,885,266 | 5/1959 | Vickery _____ 23—165 |
| 2,899,293 | 8/1959 | Munekata _____ 71—39 XR |
| 3,342,580 | 9/1967 | De Rooij _____ 71—39 |

REUBEN FRIEDMAN, Primary Examiner

B. H. LEVENSON, Assistant Examiner

U.S. Cl. X.R.

23—103, 107, 109, 165; 71—35, 43, 59